8303X PATENTED JULY 10, 1834.
J. KIRKPATRICK.
SELF BALANCING SLIDE VALVE AND SHIFTING CAM.
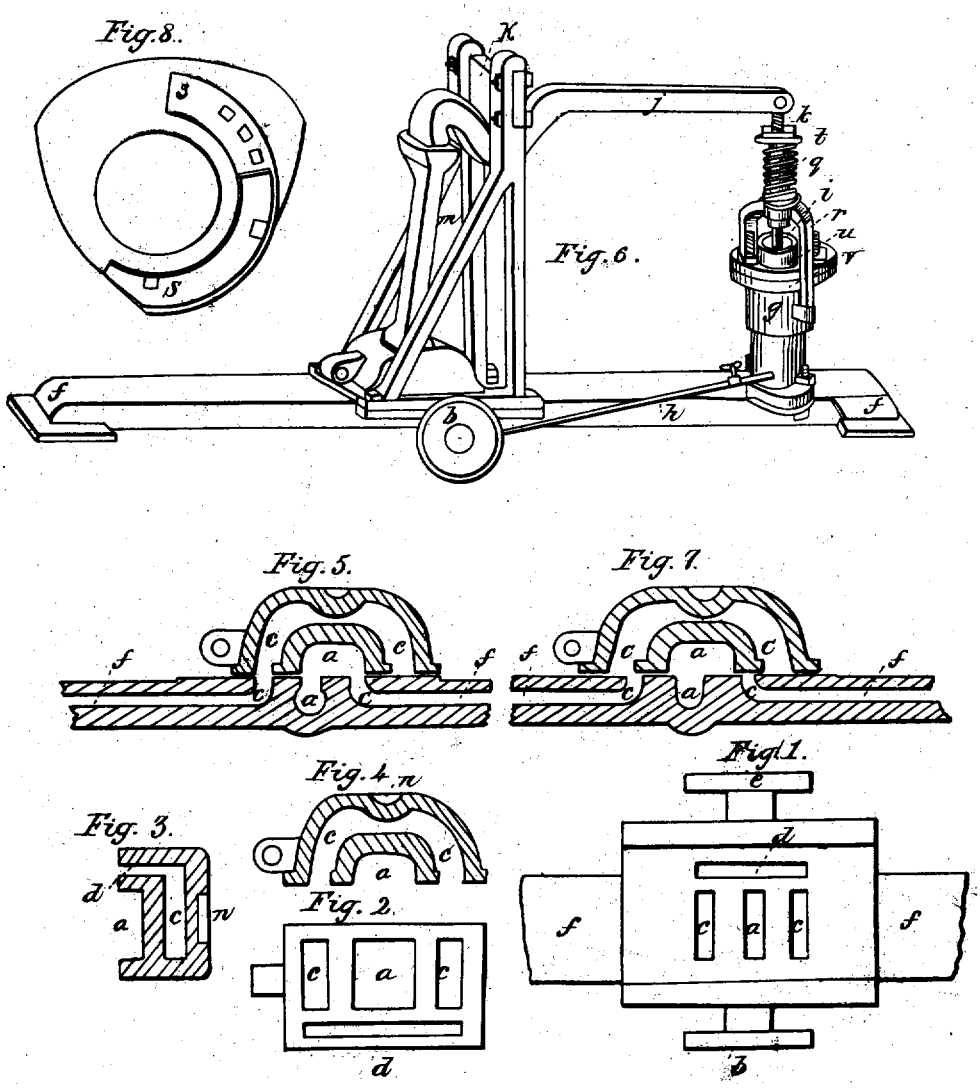

John Kirpatrick Baltimore Maryland
Letters Patent

The Schedule referred to in these Letters Patent and making part of the same containing a descrip-
tion in the words of the said John Kirpatrick himself of his improvement in the application
of Valves to Steam Engines which he denominates the Self Balancing slide valve & shifting cam.

Whereas I John Kirpatrick of Baltimore in the State of Maryland have inven-
ted a new and useful improved Slide Valve for Steam Engines with an improved Cam
suitable to the same, which I denominate the self balancing slide valve and shifting
Cam.. Now Be it Known that in conformity with the requirements of the Laws
granting patents for useful inventions. I do hereby declare that the following is a full
and exact description of my said improved valve and Cam reference being had to the draw-
ing which accompanies and makes a part of this specification
I denominate the Valve self Balancing because it is so regulated that by the action of
the steam itself the pressure of the valve upon the valve seat is always the same however
much the elastic force of the steam may vary in the Boilers and other parts of the Engine.
The cam I denominate shifting. because by shifting a circular plate attached to
it backward or forward, the steam is cut off earlier or later in the stroke which is often
required by changes of fuel ^motion or resistance of the Engine. In some respects this valve and
Cam (but more particularly the later) are similar to others now in use. and to such parts
which are so. I of course make no claim. but besides the self balancing apparatus to
be presently described there are some points in the arrangement of the steam-ways in the
valve and valve seat. which are new and which I consider as improvements. these
are the exhaust passages in the valve and valve seat. No 1. in the accompanying
drawing represents a valve seat placed upon an ordinary side pipe of an Engine & shews
in what I esteem the proper proportions for an eccentric motion.
No 2. Represents the face of a valve adapted to No 1. – No 3. is a section through the
middle of the valve in a transverse direction and vertical to its face. No 4. is a simi-
lar section Longitudinally. No 5. shows a similar section of the valve its seat and a
portion of the side pipe. No 6. is a perspective view of the whole self balancing valve and
its appendages excepting the cam. No 7. is a modification of the valve and seat, to shut
off at any part of the stroke which may be determined upon. No 8 is a shifting
cam suitable for No 7. the shifting projection plate being set at half stroke. In No 1

8303X the opening a is for the admission of Steam into the cylinder through the steam pipe b
the two parallel openings c c are for the alternate admission and escape of the steam
to and from the two ends of the cylinder being conducted into them through the cavity in the
valve a and from them by the passages in the valve c c to the longitudinal passage d
thence to the longitudinal passage in the seat d. thence out through the escape pipe e the corre-
sponding openings in the valve and seat are designated by the same letters.
The openings a. c. c. of the seat are all of the same dimensions. and the opening d. is of the
same width with them. and equal to the width of the three. and the spaces between
them. In the valve No 2 the centre opening or cavity a which may be denominated the
Steam Chest must be sufficiently wide to embrace the centre opening a. and one of the
end openings c of the seat. In sliding therefore by means of a cam or eccentric motion
the Steam will be alternately admitted into and discharged from each end of the cylinder
f.f. through the different openings of the valve and seat. For shutting off at half stroke
or any other desired point the construction of the valve is the same as that already describe
but there is a difference in the proportions of the openings and spaces in No 7. the
middle opening of the seat is of double the width of the end ones c c. the spaces between
them are of the same width with the middle opening and the cavity e of the valve or
steam Chest extends from the centre of the middle opening to the extreme edge of either
of the end openings or the centre opening of the seat may be rather less. than twice
the width of one of the end openings and the spaces rather less than that. the propor-
tions of the valve will of course vary with those of the seat. every competent Engi-
neer will readily perceive the effect of this arrangement and how it may be varied
and adapted to shut off at any desired part of the stroke by moving backwards or
or forwards the circular plate. I. of the shifting cam No. 8. The dotted lines shows
the form of the cam when the plate is shifted so to w. In No 6. b is the steam pipe
and g is a cylinder or chamber for containing a piston or plunger, into the lower
end of which cylinder steam is admitted through the tube h. the piston rod i extends
up to and is connected with the lever j. which has a knife edge or circular ful-
crum under the crosspiece k. of the frame l. the stem m. has a cavity in
the upper end to receive the end of the lever, and there is a similar cavity n in the valve to receive
the lower end of the stem. this mode of forming joints although not essential to the
general plan is extremely convenient as it affords ample bearings all of which may
be made to move in oil. it also allows the valve to be taken away without the troub-
le of turning a screw and replaced in the same manner. The size of the plunger or piston
in g must be such as shall produce the self balancing effect operating by means
of the lever upon the valve. in making this calculation. the area of one of the end
openings of the seat added to the area of the steam chest or cavity of the valve is the
area of the plunger or piston with a lever of equal length at both ends. but as the end
of the lever next the plunger will be longer than that next to the valve so inversely will
the area of the plunger be less than the area of the steam chest and one of the end
openings. The nut p upon the piston rod acts upon the spiral spring q. which
has its lower bearing upon the bow r and by means of this the degree of friction
may be regulated. on the inside of the spiral spring q is a cylinder with a flange
t directly below the nut p. This cylinder is to protect the screw on the upper part
of the piston Rod i the lower end of the cylinder passes through the upper part
of the bow r. the lower end of the piston Rod terminates at the bottom of hollow of
the plunger. u which should be about the centre of the stuffing box v the vibration
is thus taken from the Plunger while the other parts connected with the lever conform
freely to its action. ("What I claim as my invention is the general form of the valve &
its appurtenances as herein described by means of which the self balancing principle is
applied the elastic force of the steam acting upon a piston being thereby made to
react upon the the valve with any desired degree of force. Also the application of
a shifting projection to the cam (for the purposes already described) which combines
in a single cam the means of shutting off at any part of the stroke with the prin-
cipal motion of the valve") And I do hereby declare that I do not intend to confine
myself to the precise arrangements herein shown but to vary the same in any man-
ner which I may deem proper as a substitute for the throttle valve and for the pur-
pose of balancing all valves now in use. using vacu-um with pressure when neces-
sary to effect that purpose. while the same principle is applied and a similar effect
produced Witnesses
Tho. P. Jones
Rob. Clarke John Kirpatrick Drawing Exd.
[illegible]

(1456 words)